United States Patent
Moriarty

(10) Patent No.: US 9,771,460 B2
(45) Date of Patent: *Sep. 26, 2017

(54) METHOD OF APPLYING A BINDER COMPOSITION TO A LIGNOCELLULOSIC SUBSTRATE

(71) Applicant: Huntsman International LLC, The Woodlands, TX (US)

(72) Inventor: Christopher J. Moriarty, The Woodlands, TX (US)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/771,829

(22) PCT Filed: Feb. 27, 2014

(86) PCT No.: PCT/US2014/018864
§ 371 (c)(1),
(2) Date: Sep. 1, 2015

(87) PCT Pub. No.: WO2014/163914
PCT Pub. Date: Oct. 9, 2014

(65) Prior Publication Data
US 2016/0024260 A1   Jan. 28, 2016

Related U.S. Application Data

(60) Provisional application No. 61/807,112, filed on Apr. 1, 2013.

(51) Int. Cl.
*C08G 18/12* (2006.01)
*C08J 3/205* (2006.01)
(Continued)

(52) U.S. Cl.
CPC ............ *C08J 3/2053* (2013.01); *C08G 18/12* (2013.01); *C08G 18/2815* (2013.01);
(Continued)

(58) Field of Classification Search
CPC .............. C08G 18/6492; C08J 2375/04; C08J 2397/02; C09J 175/04
See application file for complete search history.

(56) References Cited

U.S. PATENT DOCUMENTS 5,536,805 A    7/1996  Kangas
2006/0283548 A1 *  12/2006  Singh ..................... C08G 18/10
                                                156/331.4
(Continued)

*Primary Examiner* — Michael A Salvitti
(74) *Attorney, Agent, or Firm* — Huntsman International LLC; Robert Diaz

(57) ABSTRACT

The present invention is directed to a method for adjusting the tack value of a binder material formed from a composition comprising an emulsion that comprises an emulsifiable prepolymer that is the reaction product of (i) an isocyanate compound, (ii) a polyol compound, and (iii) a monol compound, and wherein the method comprises: (a) determining a desired tack profile for the emulsion, wherein the tack profile comprises a tack value ranging from 1 to 4 as measured by the TACK TEST METHOD for a particular time value, and adjusting the reactive group ratio of component (i) to (ii) to achieve the desired tack value profile; (b) introducing water to components (i), (ii), and (iii) to form the emulsion composition; and (c) applying the emulsion composition to a lignocellulosic substrate thereby forming a mixture having a moisture water content ranging from 7% to 25% based on the total weight of the mixture.

12 Claims, 1 Drawing Sheet

(51) Int. Cl.
*C08G 18/76* (2006.01)
*C08G 18/48* (2006.01)
*C09J 175/04* (2006.01)
*C08G 18/64* (2006.01)
*C08G 18/28* (2006.01)

(52) U.S. Cl.
CPC ......... *C08G 18/48* (2013.01); *C08G 18/6492* (2013.01); *C08G 18/7664* (2013.01); *C09J 175/04* (2013.01); *C08J 2375/04* (2013.01); *C08J 2397/02* (2013.01)

(56) References Cited

U.S. PATENT DOCUMENTS

| | | | |
|---|---|---|---|
| 2008/0060756 A1* | 3/2008 | Schnieders | C09J 7/00 156/308.6 |
| 2008/0103263 A1* | 5/2008 | Erdem | C08G 18/706 525/410 |
| 2009/0197000 A1* | 8/2009 | Limerkens | C08G 18/672 427/340 |
| 2010/0168287 A1* | 7/2010 | Moriarty | B29C 43/3642 524/35 |
| 2012/0083554 A1* | 4/2012 | Combs | B27N 3/002 524/9 |
| 2014/0329000 A1* | 11/2014 | Moriarty | C08G 18/4837 427/8 |
| 2016/0024260 A1* | 1/2016 | Moriarty | C08G 18/28 524/733 |

\* cited by examiner

METHOD OF APPLYING A BINDER COMPOSITION TO A LIGNOCELLULOSIC SUBSTRATE

BACKGROUND OF THE INVENTION

Field of the Invention

The present invention relates generally to a method of applying a binder composition onto a lignocellulosic substrate. Specifically, the present invention relates to a method of adjusting the tack value profile of a binder composition that is applied onto a lignocellulosic substrate.

Background Information

Lignocellulosic composite panels, such as "particleboard", are typically manufactured by applying a binder to a plurality of particles, which are being tumbled in a rotary blender, to form a mixture. Afterwards, the mixture is subjected to a pressing stage that utilizes heat and pressure to cure the mixture and ultimately form the composite.

While urea formaldehyde (UF) based binders have typically been used in the composite panel industry, UF based binders have several shortcomings that have forced manufacturers in the industry to seek an alternative binder system. For instance, one shortcoming is the possible release of formaldehyde from the composite panel after the panel has been in service in a heated environment. Manufacturers, therefore, have attempted to use polyphenylene polymethylene polyisocyanate (PMDI) based binders in the manufacture of composite panels. While PDMI based binders do not possess many of the shortcomings associated with UF based binders, potential issues can still arise with the use of a PMDI based binder in the manufacturing process. For example, while PMDI based binders typically possess many of binding characteristics exhibited by UF based binders, PMDI based binders can exhibit lower tack values when compared to a UF based binder system. For example, the lower tack values of the binder can causes a variety of issues during the process of manufacturing particleboard since a "pre-mat" that is formed from a mixture of the PMDI based binder and a lignocellulosic material can only be used in limited circumstances during the manufacturing process. To compensate for the lower tack values, manufacturers have resorted to using tackifiers. The use of these tackifiers, however, has several shortcomings such as adding cost and complexity to the manufacture of a composite panel. For example, at times the manufacturing process would have to be stopped in order to remove "tackifier build-up" from the equipment used in the manufacturing process.

SUMMARY OF THE INVENTION

A method for adjusting the tack value of a binder material formed from a composition comprising an emulsion wherein the emulsion comprises water and an emulsifiable prepolymer and wherein the emulsifiable pre-polymer is the reaction product of (i) an isocyanate compound, (ii) a polyol compound, and (iii) a monol compound, the method comprising: (a) determining a desired tack profile for the emulsion, wherein the tack profile comprises a tack value ranging from 1 to 4 as measured by the TACK TEST METHOD for a particular time value, and adjusting the reactive group ratio of component (i) to (ii) to achieve the desired tack value profile; (b) introducing water to components (i), (ii), and (iii) to form the emulsion composition; and (c) applying the emulsion composition to a lignocellulosic substrate thereby forming a mixture having a moisture water content ranging from 7% to 25% based on the total weight of the mixture.

BRIEF DESCRIPTION OF THE DRAWINGS

A full understanding of the invention can be gained from the following description of certain embodiments of the invention when read in conjunction with the accompanying drawings in which.

DETAILED DESCRIPTION OF THE INVENTION

Figure 1:
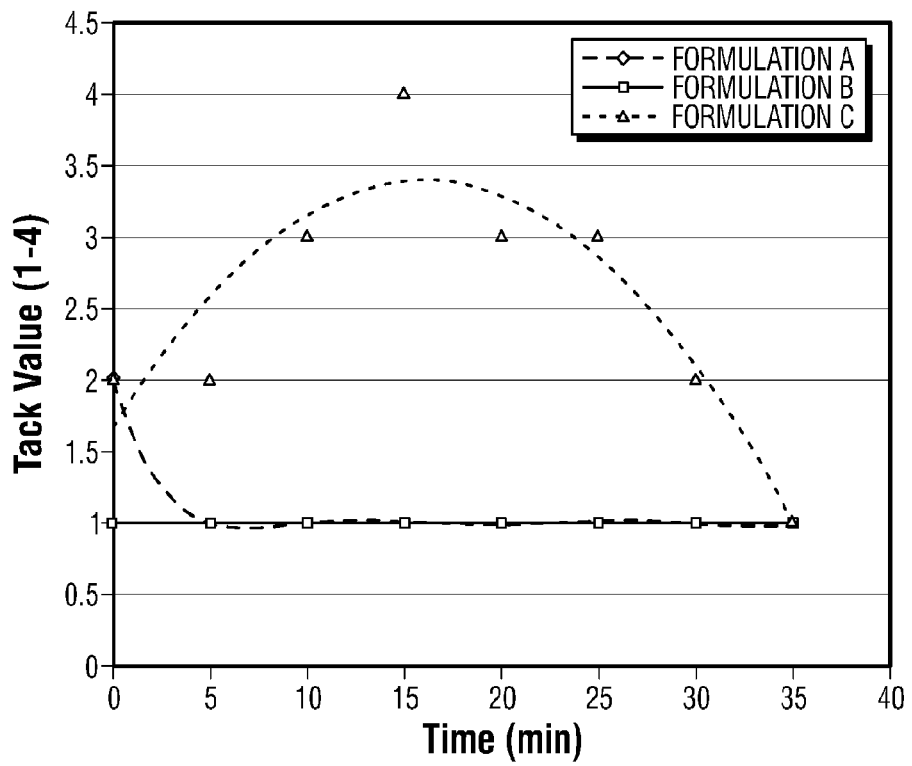
FIG. 1 is a graph depicting the tack value of various formulations versus time.

As used herein, unless otherwise expressly specified, all numbers such as those expressing values, ranges, amounts or percentages may be read as if prefaced by the word "about", even if the term does not expressly appear. Plural encompasses singular and vice versa. For example, although reference is made herein to "a" polymeric isocyanate compound, "a" polyol, "a" monol, a combination (a plurality) of these components can be used in the present invention.

As used herein, "plurality" means two or more.

As used herein, "includes" and like terms means "including without limitation."

When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "molecular weight" means weight average molecular weight ($M_w$) as determined by Gel Permeation Chromatography.

As will be discussed in greater detail below, the present invention is directed to a method for adjusting the tack value of a binder material formed from a composition comprising an emulsion wherein the emulsion comprises water and an emulsifiable pre-polymer. As used herein, "tack value" means the physical property of particles to form a cohesively bound mass when low compressive forces are applied to the mass as measured by the TACK TEST METHOD that is described in greater detail in the Examples.

Isocyante Functional Pre-Polymer ("In-Situ Prepolymer")

As will be discussed in greater detail below, the in-situ Pre-polymer, which is an emulsifiable prepolymer, is the reaction product of (i) an isocyanate compound, (ii) a polyol, and (iii) a monol.

Component (i)

The isocyanate compound used as component (i) for making the in-situ Prepolymer of the present invention comprises an organic polyisocyanate compound such as diphenylmethane diisocyanate (MDI). Suitable MDI compounds include, without limitation, 4,4'-MDI, 2,4'-MDI, polymeric MDI, MDI variants, or mixtures thereof.

In some embodiments, component (i) comprises 4,4'-MDI or a mixture of 4,4'-MDI and 2,4'-MDI, wherein the mixture comprises at least 50% of 4,4'-MDI, preferably in an amount greater than about 75% by weight such as greater than about 90% by weight or greater than about 95% by weight. In certain embodiments, component (i) comprises "polymeric MDI". As used herein, "polymeric MDI" means that the polymethylene polyphenylene polyisocyanates composition comprise a functionality of at least 2.5 such as 2.5-3.5 or 2.5-3.1. For example, polymeric mixtures of methylene bridged polyphenyl polyisocyanates containing diisocyanates, triisocyanate, and high functionality polyisocyanates can be referred to as "polymeric MDI".

Other suitable polyisocyanates that may be used as component (i) include any organic polyisocyanate compound or mixture of organic polyisocyanate compounds, provided said compounds have at least 2 isocyanate groups. Organic polyisocyanates include diisocyanates, particularly aromatic diisocyanates, and isocyanates of higher functionality. Examples of organic polyisocyanates that may be used in the composition of the present invention include aliphatic isocyanates such as hexamethylene diisocyanate; and aromatic isocyanates such as m- and p-phenylene diisocyanate, tolylene-2,4- and tolylene-2,6-diisocyanate, diphenylmethane-4,4'-diisocyanate, chlorophenylene-2,4-diisocyanate, naphthylene-1,5-diisocyanate, diphenylene-4,4'-diisocyanate, 4,4'-diisocyanate-3,3'-dimethyl-diphenyl, 3-methyldiphenylmethane-4,4'-di-isocyanate and diphenyl ether diisocyanate; and cycloaliphatic diisocyanates such as cyclohexane-2,4- and -2,3-diisocyanate, 1-methylcyclohexyl-2,4- and -2,6-diisocyanate and mixtures thereof and bis-(isocyanatocyclohexyl)methane and triisocyanates such as 2,4,6-triisocyanatotoluene and 2,4,4-triisocyanatodiphenylether. Modified polyisocyanates containing isocyanurate, carbodiimide or uretonimine groups may be employed as well. Further blocked polyisocyanates, like the reaction product of an isocyante compound with another compound such as the following compounds: phenols (e.g., octylphenol, nonylphenol, dodecylphenol), Ketones (e.g., butanone, acetylacetone), acids (e.g., mineral acids, benzyl chloride, hydrochloric acid), lactams (e.g., Vince lactam, N-Methyl-2-pyrrolidone), oximes (e.g., aldoxime, methyl ethyl ketoxime, dimethylglyoxime), imidazoles (e.g., ethyl imidazole, imidazolate salts), or combinations thereof, may be used in the present invention provided that they have a deblocking temperature below the temperature applied when using the polyisocyanate composition. In certain embodiments, the polyisocyanate may be blocked with the aforementioned compounds prior to introduction into the reagents used to form the emulsion pre-polymer of the present invention. Mixtures of isocyanates may be used, for example a mixture of tolylene diisocyanate isomers such as the commercially available mixtures of 2,4- and 2,6-isomers and also the mixture of di- and higher polyisocyanates produced by phosgenation of aniline/formaldehyde condensates. In certain embodiments, the isocyanates to be used in the present invention are those wherein the isocyanate is an aromatic diisocyanate or polyisocyanate of higher functionality such as a pure diphenylmethane diisocyanate or a mixture of methylene bridged polyphenyl polyisocyanates containing diisocyanates, triisocyanates and higher functionality polyisocyanates. Accordingly, in some embodiments, suitable polyisocyanates include SUPRASEC® isocyanates and RUBINATE® isocyanates that are available from Huntsman Polyurethanes. In some embodiments, the polyisocyanate is liquid at room temperature. The polyisocyanate mixture may be produced in accordance with any of the techniques known in the art. The isomer content of the diphenylmethane diisocyanate may be brought within the required ranges, if necessary, by techniques that are well known in the art. For example, one technique for changing isomer content is to add monomeric MDI to a mixture of MDI containing an amount of polymeric MDI that is higher than desired.

Component (ii)

The polyol compound used as component (ii) for making the in-situ Prepolymer of the present invention can comprise any polyol compounds that are known in the art such as polyether polyols, polyester pololyls, polyalkadiene polyol. For example, suitable polyols include, without limitation, those polyol compounds that comprise on a number averaged basis, from about 1.2 to about 10 active hydrogen groups per molecule, such as from 1.4 to 8 or 1.6 to about 8 or 1.8 to 6. Non-limiting examples of suitable active hydrogen groups include aliphatic alcohol groups, phenols, primary amines, secondary amines, or combinations thereof. In certain embodiments, the polyol compounds contain at least two active hydrogen groups per molecule.

In certain embodiments, the polyols that are used are polyether polyols that comprise propylene oxide (PO), ethylene oxide (EO), or a combination of PO and EO groups or moieties in the polymeric structure of the polyols. These PO and EO units may be arranged randomly or in block sections throughout the polymeric structure. In certain embodiments, the EO content of the polyol ranges from 0 to 100%. In some embodiments, the PO content of the polyol ranges from 100 to 0%. Accordingly, in some embodiments, the EO content of a polyol can range from 99 to 33% while the PO content ranges from 1 to 66%. Moreover, in some embodiments, these units can either be located terminally on the polymeric structure or within the interior sections of the polymeric backbone structure. Accordingly, suitable polyether polyols include, without limitation, poly(oxyethylene oxypropylene) diols and triols obtained by the sequential addition of propylene and ethylene oxides to di-or trifunctional initiators that are known in the art. In certain embodiments, component (ii) comprises the aforementioned diols or triols or, alternatively, component (ii) can comprise a mixture of these diols and triols.

In certain embodiments, the polyether polyols that are to be used for preparing the in-situ Prepolymer include the products obtained by the polymerization of ethylene oxide with another cyclic oxide, for example, propylene oxide in the presence of polyfunctional initiators such as water and low molecular weight polyols, for example, ethylene glycol, propylene glycol, diethylene glycol, dipropylene glycol, cyclohexane dimethanol, resorcinol, bisphenol A, glycerol, trimethylolopropane, 1,2,6-hexantriol, pentaerythritol, or combinations thereof.

In some embodiments, the polyols used as component (ii) comprise at least 15% by weight (based on the total weight of polyol) of ethylene oxide groups, such as from between 50% to 100% by weight. The polyether polyols typically have an average nominal functionality of ranging from 2-6 such as from 2-4 or 2. They have a number average equivalent weight ranging from 700 to 5,000 such as from 1000 to 4,000, from 1200 to 3500, or from 1500 to 3000. For example, in certain embodiments, the polyol comprises a hydrocarbon backbone comprising 10 to 2000 (e.g., 100-1500 or 500-1000) carbon atoms wherein no heteroatoms are dispersed between such carbon atoms.

Component (iii)

The monol compound used as component (iii) for making the in-situ Prepolymer of the present invention comprises can be a monol having a molecular weight ranging from 200 to 1500. In some embodiments, the monol comprises the chemical structure depicted in formula (I):

$$R_1-(OCH_2CH_2)_n-(CH2CHR_2O)_m-OH \qquad (I)$$

wherein $R_1$ is a group free of active hydrogen and which does not negate the hydrophilicity of the oxyethylene units; $R_2$ is either hydrogen or an alkyl group having 1 to 4 carbon atoms; n is a number from 1 to 34 and m is a number selected such that the weight ratio of oxyethylene units to other oxyalkylene groups is from 100:0 to 50:50.

In certain embodiments, $R_1$ is $C_1$-$C_4$ alkyl group, $R_2$ is either hydrogen or a methyl group, n is a number from 4 to 25 and m is a number selected such that the weight ratio of oxyethylene units to other oxyalkylene groups is from 100:0 to 60:40.

In other embodiments, $R_1$ is a methyl group, $R_2$ is hydrogen, n is a number from 6 to 20 and m is a number selected such that the weight ratio of oxyethylene units to other oxyalkylene groups is from 100:0 to 80:20.

In yet other embodiments, $R_1$ is a methyl group, $R_2$ is hydrogen, n is a number from 6 to 20 and m is zero.

Other suitable monols that can be used include methoxy polyoxyethylene, such CARBOWAX, which is available from Dow Chemical Company, Midlands, Mich., and UCON 50-HB Fluids, which is available from Dow Chemical Company, Midlands, Mich. For example, products such as CARBOWAX™ MPEG 350, MPEG 550, MPEG 750 are examples of monols that can be used in the present invention.

The in-situ Prepolymer is prepared by the reaction of an excess amount of component (i) when compared to either components (ii) or (iii). For example, in some embodiments, component (i) comprises 60 weight % to 95 weight %, component (ii) comprises 35 weight % to 1 weight %, and component (iii) comprises 10 weight % to 1 weight % based on the total weight of components (i), (ii), and (ii) used to form the isocyanate functional in-situ Prepolymer.

The in-situ Prepolymers of the invention are characterized by a viscosity less than 1000 cps at 50° C., and preferably a viscosity less than 500 cps at 50° C. The in-situ Prepolymers of the invention are characterized by having a final isocyanate content (% NCO) ranging from 6% to 32%, such as from 6% to 30% or from 7% to 30%, based on the total weight of the pre-polymer.

In some embodiments, at least 90% of the groups obtained from the reaction of the polyisocyanate and the polyether polyol in preparing the in-situ Prepolymer are urethane groups. In certain embodiments, low amounts of an additional polyisocyanate compound or a variant thereof may be added provided to the in-situ Prepolymer provided that the isocyanate (NCO) value remains in the indicated range described above. The amount added is in general preferably less than about 20% by weight based on the total weight of the in-situ Prepolymer and the additional polyisocyanate compound. The additional polyisocyanate compound or variant may be selected from the isocyanate compounds described above.

The method of preparing the in-situ Prepolymer can be any method of forming a prepolymer that is known in the art. For example, the in-situ Prepolymer may be prepared by reacting an isocyanate compound with the hydroxyl containing components, (i.e., components (ii) and (iii)). In some embodiments, a modified polyisocyanate compound, which is typically different from the isocyanate compound, can be added as a reagent after or before the introduction of the hydroxyl containing components. The reaction is typically conducted with efficient mixing, with or without the application of heat, and is usually prepared in an inert atmosphere (e.g., nitrogen or dry air). If heat is used, the mixture can be heated to a temperature ranging form from 40° C. to 90° C.

using heating methods known in the art. Otherwise, the reaction is typically conducted at ambient temperature (i.e., room temperature, 25° C.). In some embodiments, heat is applied after the reagents have been mixed. Use of a catalyst, such as JEFFCAT ZF-20 a bis-(2-dimethylaminoethyl)ether gelation catalyst available from Huntsman Corp., to catalyze the reaction is optional.

The relative amounts of each reagent, components (i), (ii), and (iii), used to form the in-situ Prepolymer will depend on the desired NCO. For example, the reactive group ratio of components (i) and (ii) can be modified to so that the emulsion composition or binder composition, which is discussed below, exhibits a particular "tack value profile". As used herein, the "tack value profile" comprises a "tack value" ranging from 1 to 4 as measured by the TACK TEST METHOD for a given time period or time value. For example, referring to Formulation B in FIG. 1, the "tack value profile" of that material comprises a "tack value" of 1.0 at time period or time value "Time 20". As used herein, "reactive group ratio" means the ratio between the number of isocyanate functional groups of component (i) to the number of hydroxyl reactive groups of component (ii). In certain embodiments, the reactive group ratio of component (i) and (ii) can range from 400:1 to 4:1 such as from 200:1 to 20:1 and 80:1 to 8:1. It has been found that increasing the reactive group ratio of the isocyanate compound to the polyol compound yields an emulsion composition with decreased "tack value" (defined in the Examples). Alternatively, decreasing the reactive group ratio of the isocyanate compound to the polyol compound yields an emulsion composition with increased "tack value". By having the capability of increasing or decreasing the "tack value" of the emulsion composition that is ultimately formed, a user of the present invention can have the capability to achieve a "tack value" that is similar to or greater than the "tack value" that is typically seen in UF based binders. The present invention, therefore, can address at least one of the inherent shortcomings of isocyanate, such as PMDI, based binders that is described above.

Because the "tack value" of the emulsion composition can be adjusted, a user can achieve particular target values or target profiles. For example, in some instances it might be desirable to have a "tack value" of 1 when the emulsion composition is initially blended with the target substrate, such as a plurality of lignocellulosic materials, at the "blending stage" (e.g., "Time 0" in FIG. 1). However, when the lignocellulosic materials are formed into a particular object during the "forming stage" (e.g., "Time 10" in FIG. 1 then, in some embodiments, it may be desirable to have a "tack value" that is higher than 1. Moreover, depending on the process that is used, the "tack value" of the binder material at the "mat on line stage" or the "pressing stage" can be the same or different as those mentioned above. It should be noted that the aforementioned stages (e.g., "blending stage", "forming stage", etc) are known to those skilled in the art and a discussion about each particular stage is not necessary for purposes of this invention.

Formulation C of FIG. 1 show that the emulsion composition of the present invention can be adjusted so that it exhibits "dynamic tack" as opposed to "static tack" and, therefore, the emulsion or binder composition of the present invention can be tailored to achieve a desired "tack value profile" thereby allowing the user to optimize the process in which the emulsion composition is used. As used herein, "dynamic tack" means that the "tack value" of the composition can change over a given time period. In other words, the composition can have a "tack value profile" that is not flat, but rather changes depending on when the "tack value" of the composition is measured (see "Tack Level" vs. "Time" values of Formulation C in FIG. 1). On the other hand, a composition having "static tack" has a constant "tack value" that does not change over a given timer period. That is, compositions having "static tack" has a "tack value profile" that is substantially flat (see Formulations A and B in FIG. 1).

Emulsion Composition

As stated elsewhere herein, the emulsion composition is comprised of the in-situ Prepolymer and water. Unlike other processes where a prepolymer compound is completely formed prior to introduction of water, the in-situ Prepolymer of the present invention can be formed in-situ with water. Accordingly, in some embodiments, the in-situ Prepolymer is partially formed prior to the introduction of water to the process. For example, the reagents used to form the in-situ Prepolymer (e.g., components (i) to (iii) and, if applicable, the modified polyisocyante compound described above) can be allowed to react with one another for a time frame ranging from 1 second to 5 minutes. In other embodiments, however, the reagents are allowed to react for a time frame greater than 1 to 5 seconds in order to meet various processing requirements. In both of these examples, water is added during the formation of the in-situ Prepolymer and the in-situ Prepolymer is ultimately formed in-situ with water. Alternatively, the method of the present invention also allows for water and the reagents used to form the in-situ Prepolymer to be added simultaneously with one another. In this particular embodiment, the in-situ Prepolymer is not formed prior to the introduction of water because the reagents used to form the in-situ Prepolymer are not pre-reacted with another. Therefore, complete formation of the in-situ Prepolymer occurs in-situ with water.

Irrespective of whether the in-situ Prepolymer is formed partially or completely in-situ with water, ultimately, an emulsion composition is formed by the introduction of water into the reagents used to form the in-situ Prepolymer and this emulsion composition is part of the binder material that is applied onto the various substrates disclosed herein.

While it is anticipated that any type of water (e.g., deionized water, tap or municipal water, filtered water, or "softened" water) may be used to form the emulsion described herein.

The method used to form the emulsion can be any method that is known in the art. In some embodiments, the emulsion is formed by introducing water and all of the reagents used to form the in-situ Prepolymer into an inline static mixer, such as Model 275 available from Koflow Corporation, and thoroughly mixing the mixture for a time period ranging from 1 minutes to 30 minutes. While introduction of water and the aforementioned reagents is described in connection with an inline static mixer, other batch or continuous methods for preparing an emulsion known in the art may also be used. The formation of the emulsion can be conducted with or without the application of heat. If heat is used, the mixture can be heated to a temperature ranging form from 15° C. to 65° C. using heating methods known in the art. Otherwise, the formation of the emulsion is typically conducted at ambient temperature (i.e., room temperature, 25° C.).

The in-situ Prepolymer of the present invention is present in the emulsion at in an amount ranging from 90 weight % to 10 weight % while water is present in an amount ranging from 10 weight % to 90 weight % based on the total weight of the in-situ Prepolymer and water in the emulsion. In some embodiments, both the in-situ Prepolymer and water each comprise 50 weight % of the emulsion based on the total weight of both components in the emulsion.

In order to further improve the storage stability and/or processing stability of the emulsion composition, other secondary additives can be added to the emulsion composition. For example, a diluent may be added to the emulsion composition. Suitable diluents include plasticizers of the type mentioned in "Taschenbuch der Kunststoff-Additive", Ed. by R. Gachter and H. Muller, Carl Hanser Verlag Munchen, third edition, 1989. Preferred diluents are phthalates, aliphatic carboxylates, fatty acid esters, linseed oil, soybean oil and propylene carbonate. These diluents can be added in amounts ranging from 0.5 weight % to 50 weight % based on the total weight of the emulsion. The emulsion composition may comprise conventional additives like flame retardants, lignocellulosic preserving agents, fungicides, waxes, sizing agents, fillers, surfactants, thixotropic agents and other binders like formaldehyde condensate adhesive resins and lignin (optionally in combination with a lignin solvent such as described in PCT Patent Application No. EP96/00924).

In yet other embodiments, a release agent can be added to the reactive ingredients used to form the in-situ Prepolymer or the ingredients used to form the emulsion described above. Suitable release agents that can be used include, without limitation, fatty acids, waxes, silicones, and various soaps and detergents. These release agents can be used in amounts ranging from 0.33 weight % to 33% weight %, such as from 0.66 weight % to 16.5 weight % based on the total weight of the composition.

Other secondary additives that can be added to the emulsion composition also include, without limitation, sizing waxes, biocides, fire retardants, blocking agents known in the art. For example, the blocking agents can be used in amounts ranging from 0.01 weight to 1.0 weight % based on the total weight of the emulsion composition and biocides may be used in amounts ranging from 0.005 weight % to 0.5 weight % based on the total weight of the emulsion composition.

In addition to the aforementioned additives, in some embodiments, the emulsion composition can comprises a catalyst such as a metallic catalyst. Suitable metallic catalysts that can used in the present invention include, without limitation, organometallic compounds, such as those that comprise at least one transition metal. The transition metal can be selected from Groups IVB, VB, VIIB, VIIB, and VIIIB of the Periodic Table of the Elements. In some embodiments, the metallic catalyst comprises an organometallic compound comprising one or more metals selected from the group consisting of the metals of Group VIIIB, such as iron, of the Periodic Table. In certain embodiments, the organometallic compound comprises one or more chelating ligands. Non limiting examples of such chelating ligands include, without limitation, acetylacetone, alkyl or aryl acetoacetate esters, gluconate, cyclopentadienyl, or combinations thereof. In some embodiments, the metallic catalyst that can be used as component (ii) can be any of those that are described in the following US patents: U.S. Pat. Nos. 5,587,414, 6,288,200, 6,908,875, 6,750,310, 6,288,255, and 6,762,314.

Other suitable catalysts that can be used as component (ii) include, without limitation, organotin compounds, such as dialkyltindicarboxylates (e.g., dimethyltin dilaurate, bibutyltin dilaurate, dibutyltin di-2-ethyl hexoate, dibutyltin diacetate, dioctyltin dilaurate, dibutyltin maleate, dibutyltin diisooctylmaleate); stannous salts of carboxylic acids (e.g., stannous octoate, stannous diacetate, stannous dioleate); mono- and diorganotin mercaptides (e.g., dibutyltin dimercaptide, dioctyltin dimercaptide, dibutyltin diisooctylmercaptoacetate); diorganotin derivates of beta-diletones (e.g., dibutyltin bis-acetylacetonate); diorganotin oxides (e.g., dibutyltin oxide); and mono- or diorganotin halides (e.d., dimethyltin dichloride and dibutyltin dichloride). Other suitable catalysts that can be used as component (ii) also include, without limitation, organobismuth compounds, such as bismuth carboxylates (e.g., bismuth tris(2-ethlhexoate), bismuth neodecanoate, and bismuth naphtenate).

Accordingly, in certain embodiments, the metallic catalyst can include, without limitation, organometallile compounds that are derived from iron (e.g., ferric acetylacetonate), cobalt acetylacetonate, nickel acetylacetonate, dibutyl tin dilaurate, dibutyltin mercaptide, bismuth tris(2-ethylhexoate) or combinations thereof. In certain embodiments, the metallic catalyst is an organometallic compound that is a derivative of iron. One skilled in the art would recognize that, in certain embodiments, ferric acetylacetonate, cobalt acetylacetonate, nickel acetylacetonate can be described as comprising a chelating ligand and a transition metal.

Description of Target Substrate Material

The emulsion composition of the present invention is typically applied onto a target substrate material in order to form a mixture having a moisture water content ranging from 7% to 25%, such as 10% to 20%, based on the total weight of the mixture. In certain embodiments, the target substrate material comprises a lignocellulosic material which can include, without limitation, wood, woodbark, cork, bagasse straw, flax, bamboo, esparto, rice husks, sisal fibers, coconut fibers, wood chips, wood fibers, wood shavings, wood dust, wood flour, kenaf, nut shells, hulls from cereal grains (e.g., rice and oats), or combinations thereof. Additionally, there may be mixed with the lignocellulosic materials other particulate or fibrous materials such as ground foam waste (e.g., ground polyurethane foam waste), mineral fillers, glass fibre, mica, rubber, textile waste such as plastic fibers and fabrics. These materials may be used in the form of granulates, shavings or chips, fibers, strands, spheres or powder. In certain embodiments, these materials may have a moisture content ranging from 2% to 50% such as from about 5% to 20% or from 8% to 20%. When the emulsion composition of the invention is applied to the lignocellulosic material, the weight ratio of emulsion composition to the lignocellulosic material will vary depending on the bulk density of the lignocellulosic material employed. The emulsion compositions may be applied in such amounts to give a weight ratio of emulsion composition to lignocellulosic material ranging from 1:99 to 1:4 such as from 1:40 to 1:8. If desired, other conventional binding agents, such as formaldehyde condensate adhesive resins known in the art, may be used in conjunction with the emulsion composition of the present invention.

Description of the Process for Preparation of a Lignocellulosic Composites

1. Preparation of a Lignocellulosic Target Substrate

In certain embodiments of the present invention, the lignocellulosic target material is first dried to the required moisture content. The required moisture content can range from 1% to 20% by weight.

2. Application of the Emulsion Composition to the Target Substrate

The emulsion composition can then be added to the target material in a quantity of from ranging from 1 weight % to 30 weight % based on the total weight of the emulsion and the target material.

3. Formation of the Pre-Mats/Pre-Shape

The resultant mixture of the target material and the emulsion composition can then be formed into "pre-mats" for panel manufacture or any other required shape. The use of an emulsion composition of the present invention can increase the tack value of the pre-mats, thus allowing for the more efficient production of the final article due to improvement in consistency in mat/shape integrity prior to pressing and, therefore, can result in less wastage due to poor lignocellulosic distribution.

4. Pressing the Pre-Mat/Pre-Shape

The pre-mat/pre-shape may then be compressed to form panels or three dimensional, shaped, molded articles and cured under heat and pressure. Suitable temperatures for the compression process are generally in the range of from 70° C. to 250° C. such as from 120° C. to 220° C. or from 140° C. to 205° C. Pressures used in compression processes to achieve the required product dimensions can range from 15 bar to 300 bar. Compression times will be dependent upon the thickness and density of the product being produced. In some embodiments, use of the emulsion composition of the present invention can allow a user form articles with thicknesses of greater than 25 mm or more without the use of a steam injection pre-heaters, radio frequency pre-heaters and steam injection pressing.

Multi-layered boards or molded parts may be produced in an analogous manner from veneers, paper or woven fabrics by treating the layers with the emulsion composition described above and subsequently pressing them, generally at elevated temperature and pressure. Temperatures experienced directly by the surface of the composite can range from 100° C. to 205° C. such as from 140° C. to 220° C. Temperatures experienced by the core of the composite to ensure the production of composites with desired dimensional stability and physical performance when using a polyisocyanate composition of the invention may range from 70° C. to 140° C., such as from 80° C. to 130° C. or from 85° C. to 120° C. The initial compression pressure can range from 15 bar to 300 bar such as from 50 bar to 200 bar.

It is noted that in this step, the emulsion or binder composition is substantially cured.

5. Post Pressing/Final Product

The composite wood products produced with the binder of the present invention can exhibit an excellent appearance due to the significantly lower pressing temperature coupled with reduced cycle times which result in significantly reduced surface degradation or charring of external release agents. In addition, excellent internal bond properties, good dimensional stability and excellent exterior durability of the resulting materials are obtained and they may thus be used in any of the situations where such articles are customarily used. Moreover, unlike other composite wood product that have a relatively low moisture content after formation of the composite product, the composite wood product (lignocellulosic composite) of the present invention exhibits a relatively high moisture content. For example, the moisture content of composite wood product of the present invention can range from 5% to 15%, such as from 6% to 15% or from 8% to 15%, based on the total weight of the composite wood product while composite wood products using conventional methods of manufacture have a moisture content ranging from 1% to 5%.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof. Therefore, any of the features and/or elements which are listed above may be combined with one another in any combination and still be within the breadth of this disclosure.

EXAMPLES

Preparation of the Emulsion Composition:

Emulsions were prepared by mixing a polyol blend to pMDI using the components found in Table 1, followed by a water emulsification of the polyol blend and pMDI mixture. Mixtures were prepared in a 250 ml glass jar and hand shaken for about 30 seconds until a consistent milky-white emulsion was formed.

TABLE 1

Formulations A-D:

| Component | Formulation A (Control eMDI) | Formulation B (Control pMDI) | Formulation C (Polyol #1) | Formulation D (Polyol #2) |
| --- | --- | --- | --- | --- |
| pMDI | 475 | 500 | 400 | 417 |
| Monol | 25 | 0 | 29 | 21 |
| Polyol #1 | 0 | 0 | 71 | 0 |
| Polyol #2 | 0 | 0 | 0 | 62 |
| Total weight (grams) | 500 | 500 | 500 | 500 |

The Tack Test Method:

Tack testing was performed on wood particles blended with the binder formulations prepared in accordance with Table 1 and the method described above. Testing was performed according to the TACK TEST METHOD which is as follows:

Wood particles obtained from a commercial particleboard process were screened to remove the small and large particles using a Cason sifting machine. Particles were then equilibrated for 2 weeks in a humidity cabinet to 10% equilibrium moisture content (EMC). 30 grams of the prepared wood particles were added to a small food processor machine. Emulsions were prepared by mixing 50 grams each of water and the in-situ Prepolymer in a 250 ml glass jar and hand shaken for about 30 seconds until a consistent milky-white emulsion was formed. The particles were blended in the food processor for approximately 60 seconds while the binder emulsions were drip added to the wood particles while mixing. After mixing the blended material was removed from the food processor and placed in the experimenters hand (holding hand). Next, a ball is attempted to be made in the hand by compressing the material for three seconds. The compressing is accomplished by squeezing the ball with the holding hand and with the other free hand. The resulting material "ball" (or lack of a ball) was then evaluated by bouncing the ball in the holding hand. The material ball was then given a tack rating ("tack value") based on the formed ball integrity. This rating system is shown in Table 2 below. After tack assessment, the material is then placed in a neat pile on the laboratory bench top and again tested for tack every 10 minutes, until 40 minutes from blending time has passed.

TABLE 2

Tack Rating System (Tack Value or Tack Level):

| Tack Rating* | Description |
| --- | --- |
| 1 | No Tack (no ball formed) |
| 2 | Slight Tack (weak ball formed, falls apart with bouncing) |
| 3 | Tack (ball is formed, mostly stays together while bounced) |
| 4 | High Tack (tight ball is formed and stays intact while bouncing) |

*½ ratings are used in cases where the results fall between two ratings on the Tack Rating scale.

Table 3 displays the tack testing results for the binder formulations prepared with the reagents listed in Table 1. The tack results were determined using the TACK TEST METHOD described above.

TABLE 3

Tack Testing Results (Tack Rating 1-4 per the TACK TEST Method):

| Time (minutes from blending) | Formulation A (Control eMDI) | Formulation B (Control pMDI) | Formulation C |
| --- | --- | --- | --- |
| 0 | 2 | 1 | 2 |
| 5 | 1 | 1 | 3 |
| 10 | 1 | 1 | 4 |
| 15 | 1 | 1 | 3 |
| 20 | 1 | 1 | 3 |
| 25 | 1 | 1 | 2 |
| 30 | 1 | 1 | 1 |
| 35 | 1 | 1 | 1 |

Referring to FIG. 1 and Table 3, the data shows that Formulations A and B exhibited not only "static tack" properties but they had no tack properties whatsoever (i.e., they had a tack value of 1). In contrast, Formulation C exhibited "dynamic tack" properties. Accordingly, tack properties can be imparted to pMDI based in-situ Prepolymers as disclosed in the present invention. Moreover, as can be seen from FIG. 1 and Table 3, the tack value can be controlled by modifying the type of polyol and/or the reactive group ratio between the polyol and the isocyanate compound used in the invention thereby imparting dynamic tack properties to the binder material of the present invention. Accordingly, by using the present invention, an emulsion that substantially mimics the tack profile of a urea formaldehyde resin, which are typically used in the industry, can be achieved. Therefore, the present invention can allow for the use of a formaldehyde free emulsion as a binder for lignocellulosic materials.

Moisture Content

Formulation D was used to show the impact of moisture content on the amount of tack that can result from an emulsification composition of the present invention. Table 4 displays the tack testing results for the binder formulations prepared with the reagents listed for Formulation D in Table 1. The tack results were determined using the TACK TEST METHOD described above.

TABLE 4

Tack Testing Results (Tack Rating 1-4 per the TACK TEST Method):

| Time (minutes from blending) | Formulation D 5% Moisture Content | Formulation D 10% Moisture Content | Formulation D 15% Moisture Content | Formulation D 20% Moisture Content |
|---|---|---|---|---|
| 0 | 1.5 | 2 | 3 | 2.5 |
| 5 | 1.5 | 2.5 | 4 | 3 |
| 10 | 2 | 2 | 3 | 4 |
| 15 | 1 | 1.5 | 3 | 3.5 |
| 20 | 1 | 1 | 2.5 | 3 |
| 25 | 1 | 1 | 2 | 3 |

Figure 2:
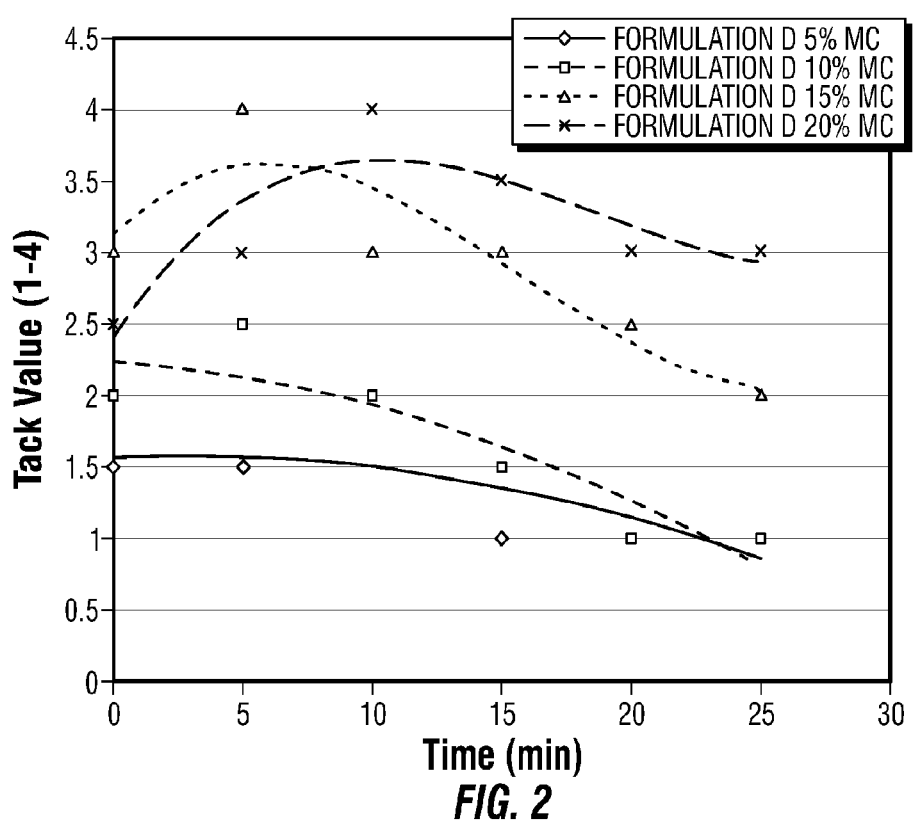
FIG. 2 is a graph depicting the tack value of a formulation having a specific moisture content versus time.

Referring to FIG. 2 and Table 4, the data shows that, at any given time, the tack value of Formulation D increases as the moisture content of the mixture increases.

What is claimed is:

1. A method for adjusting the tack value of a binder material formed from a composition comprising an emulsion wherein the emulsion comprises water and an emulsifiable prepolymer and wherein the emulsifiable pre-polymer is the reaction product of (i) an isocyanate compound, (ii) a polyol compound, and (iii) a monol compound, the method comprising: (a) determining a desired tack profile for the emulsion, wherein the tack profile comprises a plurality of tack values over a period of time ranging from 0 minutes to 40 minutes and wherein the tack values have a rating ranging from 1 to 4 as measured by the TACK TEST METHOD; adjusting the reactive group ratio of component (i) to (ii) to achieve the desired tack value profile; (b) introducing water to components (i), (ii), and (iii) to form the emulsion composition and forming the emulsifiable prepolymer in situ in the water; (c) applying the emulsion composition to a lignocellulosic substrate thereby forming a mixture having a moisture water content ranging from 7% to 25% based on the total weight of the mixture; and wherein the TACK TEST METHOD comprises the steps of blending wood particles with the emulsion to form a blended material and compressing the blended material to measure the tack value rating; and wherein a tack value rating of 1 represents no tack, 2 represents slight tack, 3 represents tack, and 4 represents high tack.

2. The method according to claim 1, wherein the reactive group ratio of component (i) to (ii) is adjusted prior to step (b).

3. The method according to claim 1, wherein the method further comprises (d) curing the mixture after step (c).

4. The method according to claim 3, wherein the method further comprises blending the mixture prior to curing.

5. The method according to claim 4, wherein the method further comprises adding a secondary additive compound to the mixture prior to curing the mixture.

6. The method according to claim 5, wherein the secondary additive comprises a release agent, a diluent, or combinations thereof.

7. The method according to claim 1, wherein the polyol compound comprises a hydrocarbon backbone comprising 4 to 2000 carbon atoms, and wherein no heteroatoms are dispersed between such carbon atoms.

8. The method according to claim 1, wherein the polyol compound comprises a polyether polyol, polyester polyol, polyalkadiene polyol, or combinations thereof.

9. The method according to claim 1, wherein component (i) comprises 60 weight % to 95 weight %, component (ii) comprises 1 weight % to 35 weight %, and, when present, component (iii) comprises 1 weight % to 10 weight % based on the total weight of components (i), (ii), and (iii).

10. The method according to claim 1, wherein the ratio of water to emulsifiable prepolymer ranges from 7:1 to 1:1 based on the total weight of the emulsfiable prepolymer and water.

11. The method according to claim 1, wherein the emulsifiable prepolymer has an NCO content ranging from 18% to 28% weight percent based on the total weight of the emulsifiable prepolymer.

12. The method according to claim 1, wherein component (iii) comprises the following chemical structure:

$CH_3-(OCH_2CH_2)_n-OH$ wherein n is 1 to 34.

* * * * *